J. WILLSEY & T. SHIVERICK.
Filter.
No. 228,794.    Patented June 15, 1880.
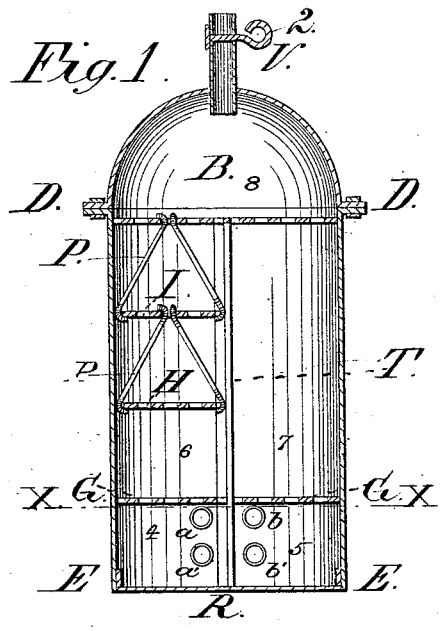
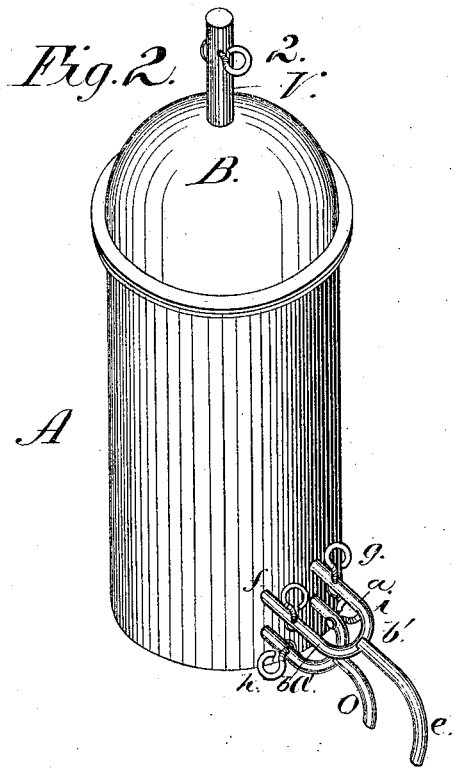
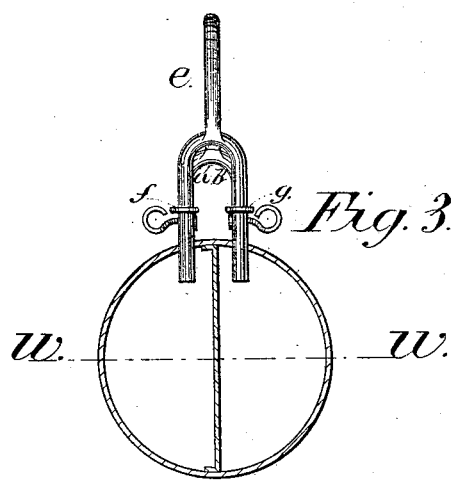
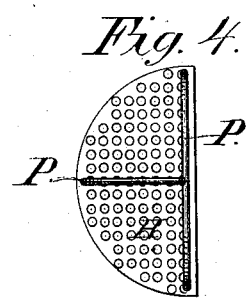
Witnesses:
Arthur G. Morey
J. E. Tate
Inventor:
Jackson Willsey
Thomas Shiverick
By G. L. Chapin Atty

UNITED STATES PATENT OFFICE.

JACKSON WILLSEY AND THOMAS SHIVERICK, OF CHICAGO, ILLINOIS.

FILTER.

SPECIFICATION forming part of Letters Patent No. 228,794, dated June 15, 1880.

Application filed January 26, 1880.

*To all whom it may concern:*

Be it known that we, JACKSON WILLSEY and THOMAS SHIVERICK, of Chicago, in the county of Cook and State of Illinois, have invented a new and useful Improvement in Water-Filters, of which the following is a specification, reference being had to the accompanying drawings, illustrating the same, in which—

Figure 1 is a vertical sectional elevation of our improved water-filter, taken on line W, Fig. 3; Fig. 2, a perspective representation of the exterior of the filter complete; Fig. 3, a horizontal section taken on line X X, Fig. 1; Fig. 4, a plan or top view of one of the filtering-lifters removed from the case.

The nature of the present invention consists in a partitioned filter-case provided with a forked inlet-pipe and a forked outlet-pipe for the purpose of insuring a return current of filtered water through either of the filtering-chambers, for the purpose of driving out the sediment or extraneous substance which has been filtered from the water and conducting it to a sewer or other suitable place.

It has been the custom to construct filters to be reversed—that is, to run the current of water through from the opposite end of the filter, where the filter has become filled with extraneous matter, and in some experiments to clean a stationary filter by turning a current of unfiltered water down and back through the filtering substance; but this latter method leaves a deposit on the top of the filtering material to be thrown into the filtered water so soon as the filtering process is resumed. By means of our improvement, the cleaning being done by filtered water, no impure water passes through the discharge-pipe of the filter.

A represents a cylindrical filtering-case, which is to be made of any non-corrosive material which will withstand the water-pressure from the pipes of the main. We find, however, that No. 16 galvanized-iron plate will answer the purpose where water is not to be raised over four or five stories. In practice the cylinder is generally made one foot in diameter and from three to three and one-half feet in length. A bottom, R, is turned up at E on the inside of the cylinder A and secured by rivets, or rivets and solder. A bottom, G, in each compartment is secured to the semi-internal periphery of the cylinder and to the partition T. This partition is secured by rivets or solder, or both, to the center of the cylinder A, and it extends from the bottom R to the lower part of the dome B, which is secured to the cylinder A by means of bolts put through flanges D, turned outward on the lower part of the dome B and top part of the cylinder. A discharge-pipe, $v$, is secured to the dome B for the outward flow of filtered water. An inlet-pipe, $e$, from the main is provided with branches $a\ b$, communicating with the two chambers 4 5 of the filter, respectively, and a discharge-pipe, O, also has branch pipes $a'\ b'$, also communicating with the respective chambers below the perforated bottom G G. This bottom may be made of strong wire-cloth or perforated metal plate having such sized apertures as to retain the filtering substance.

It is necessary in filters, to remove both sediment and coloring-matter, to use two or more kinds of filtering material in the cylinder, and in order to keep the materials separate we employ, as shown, perforated semi-disks H I, of metal, and attach wires P P P to their remotest parts and bring the wires up through the filtering material resting on the semi-disk to which the wires are attached, so that by lifting on the wires the semi-disk and the filtering material will be drawn out.

Fine-crushed sandstone or clean fine sand will answer for the filling below H, and bone-charcoal finely pulverized for the filling from H to I, and sand may also be used for the top of the filter from I to the top of the cylinder.

We, however, do not claim nor confine ourselves to any particular kind of filtering substance, but use that kind best adapted to purify any kind of water; but where different kinds of filtering material are used the lifters H I are a great convenience in removing one or more sections of filling without disturbing that section lying below.

To use the filter, open the cock 2 in pipe $v$ and cocks $f\ g$ in the branches $a\ b$ of pipe $e$, and let the cocks $h\ i$ in branches $a'\ b'$ of pipe $o$ remain closed. This will permit water first to flow into the chambers 5 4, and then be filtered through the filter-chambers 6 7 and to enter chamber 8, formed by the dome B, and into the discharge-pipe v.

To clean the filtering material of extraneous matter, open cock i in branch b' of pipe o and close cock g in branch a of pipe e. This will continue the flow of water up through chambers 6 and 4, and if the cock 2 to pipe v be closed the current will be drawn through chambers 5 and 7, and the sediment in the lower part of the filtering material will be discharged at pipe o. To clean the parts 4 and 6, shut cock i, open cock h, and open cock g, and close cock f.

We claim and desire to secure by Letters Patent—

The combination of the five compartments—viz., 4 5 6 7 8—with the pipes e and o and their branches a b a' b', for filtering water and cleaning the filtering substance with filtered water, substantially as specified.

JACKSON WILLSEY.
THOMAS SHIVERICK.

Witnesses:
G. L. CHAPIN,
A. G. MOREY.